(12) United States Patent
Elliott (10) Patent No.: US 7,311,744 B2
(45) Date of Patent: Dec. 25, 2007

(54) CYCLONIC SEPARATOR FOR MIST COLLECTORS

(76) Inventor: Michael R. Elliott, 3534 Minnie La., Beloit, WI (US) 53511

( * ) Notice: Subject to any disclaimer, the term of this patent is extended or adjusted under 35 U.S.C. 154(b) by 808 days.

(21) Appl. No.: 10/606,149

(22) Filed: Jun. 25, 2003

(65) Prior Publication Data

US 2006/0266012 A1   Nov. 30, 2006

Related U.S. Application Data

(63) Continuation-in-part of application No. 09/930,770, filed on Aug. 15, 2001, now abandoned.

(51) Int. Cl.
  *B01D 45/12* (2006.01)
(52) U.S. Cl. .......................... 55/396; 55/423; 55/426; 55/457; 55/466
(58) Field of Classification Search .................. 55/396, 55/423, 426, 457, 466, 315
  See application file for complete search history.

(56) References Cited

U.S. PATENT DOCUMENTS

| | | | | |
|---|---|---|---|---|
| 1,411,606 A | * | 4/1922 | Brereton | 55/395 |
| 3,885,935 A | * | 5/1975 | Nutter | 55/457 |
| 5,035,730 A | * | 7/1991 | Kisaragi et al. | 55/434.4 |

* cited by examiner

*Primary Examiner*—Robert Hopkins
(74) *Attorney, Agent, or Firm*—Keith Frantz (57) ABSTRACT

A separator placed in a mist collection system prior to a final air cleaning stage, and is configured to remove a substantial portion of the mist from the air. The separator includes stationary vanes in a cylindrical housing to establish a cyclonic flow therethrough, an annular flow restriction collar to establish a liquid collection area at the downstream end of the housing, a drain for discharge of the liquid from the collection area, and a flow interrupter to direct the swirling liquid into the drain.

41 Claims, 7 Drawing Sheets

CYCLONIC SEPARATOR FOR MIST COLLECTORS

CROSS-REFERENCES TO RELATED APPLICATIONS

This application is a continuation-in-part application of U.S. patent application Ser. No. 09/930,770, filed Aug. 15, 2001 now abandoned.

REFERENCE TO SEQUENCE LISTING TABLE OR COMPUTER PROGRAM LISTING APPENDIX SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates generally to mist collectors and mist collection systems of the type suitable to remove oil mist, water vapor, synthetic coolant mist and other mist from the air surrounding commercial machining operations.

More particularly, the invention relates to a separator to remove a substantial portion of such mist prior to the contaminated air reaching a final stage cleaning device in the mist collection system.

2. Description of Prior Art

Mist collectors are commonly used in commercial machining environments to remove contaminating mist from the air, particularly in the areas surrounding grinding and other machining operations.

During commercial grinding and machining operations, a liquid coolant/lubricant is often sprayed at the location of cutting engagement between a workpiece and cutting tool for lubrication and cooling of the tool. The majority of this coolant falls to a collection center. However, a portion of the coolant spray remains in the air in the form of relatively heavy mist. For obvious health, cleanliness and economic reasons, it is desirable to remove this mist from the air, and if suitable, return the liquid to the reservoir supplying coolant to the machine.

Numerous mist collectors are commercially available to remove this contaminating mist from the air. Some of the more common types are electrostatic mist collectors, centrifugal mist collectors, and mist collectors that use filter media. As to be expected, each type of mist collector has it advantages and disadvantages. However, all mist collectors require a certain level of periodic service and maintenance for proper performance.

Centrifugal mist collectors are well suited for heavy-duty environments, and are typically capable of collecting substantial volumes of mist. However, centrifugal mist collectors can require frequent maintenance to keep the centrifuge balanced. This maintenance typically requires trained service personnel, and can be time consuming and relatively expensive. Filter collectors are easier to service than centrifugal collectors, and normally require only cleaning or changing the filter media. However, in heavy-duty environments, the labor time to frequently clean and change the filter media, and the replacement filter costs can be substantial. Electrostatic mist collectors are particularly useful in smoky environments, but are relatively expensive to purchase, and still require periodic cleaning to maintain rated cleaning performance.

Thus, it is apparent that there is an ever present need and desire to reduce the costs associated with periodic maintenance of these and other type mist collection systems. In particular, it is desirable that a low-maintenance, relatively low cost apparatus be provided that would remove a substantial portion of the mist from the air prior to reaching the filter, centrifuge, or other final stage cleaning device in a mist collection system.

SUMMARY OF THE INVENTION

The general aim of the present invention is to provide a new and improved separator adapted to be placed in a mist collection system of the subject type, and operative remove a substantial portion of the mist from the contaminated air prior to the air reaching the final stage cleaning device. As a result, the separator hereof decreases the need for and expense associated with periodic maintenance requirements of the final stage cleaning device in prior mist collection systems.

Another aim of the invention is to provide a separator that reliably removes mist from the air, yet is relatively inexpensive, that does not require the use of moving or consumable parts, and does not require periodic cleaning or maintenance service.

Still another objective is achieve the foregoing with an improved separator configured for relatively low pressure drop to facilitate use in existing mist collection systems without the need to change the installed fans.

A detailed objective is to provide an in-line flow-through separator having coaxial inlet and exit openings, and a cylindrical tubular housing extending coaxial therebetween, the housing being preferably located radially outwardly of the inlet and outlet openings to define an expansion chamber at the upstream end to achieve a relatively low pressure drop.

Another detailed objective of the invention is to provide stationary vanes in the upstream portion of the housing to establish a cyclonic flow as the contaminated air flows into and through the unit. This cyclonic action causes the mist to migrate outwardly and travel in the downstream direction along the inside diameter wall of the housing.

Another detailed objective is to provide an annular flow restrictor sized to establish an annular liquid collection chamber at the downstream end of the housing. The annular space between the flow restrictor and the inside diameter of the housing allows the liquid to flow into the collection area, while the flow restrictor prevents the liquid from being sucked back into the air flow as it exits the separator. In preferred embodiments, the flow restrictor diverges conically in the downstream direction to provide for a converging entrance to the collection chamber.

Still another objective is to provide a flow interrupter in the form of a deflector that projects into the collection chamber to direct the swirling liquid therein into a drain, whereupon the liquid may be either returned to the reservoir or disposed of as desired.

Yet another objective is to provide an alternate flow interrupter in the form of a drop-down chamber that extends longitudinally parallel to and in communication with the collection chamber to establish a smoothly transitioning flow path and drainage reservoir prior to the liquid reaching the drain port.

These and other objectives and advantages of the invention will become more apparent from the following detailed description when taken in conjunction with the accompanying drawings.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 1:
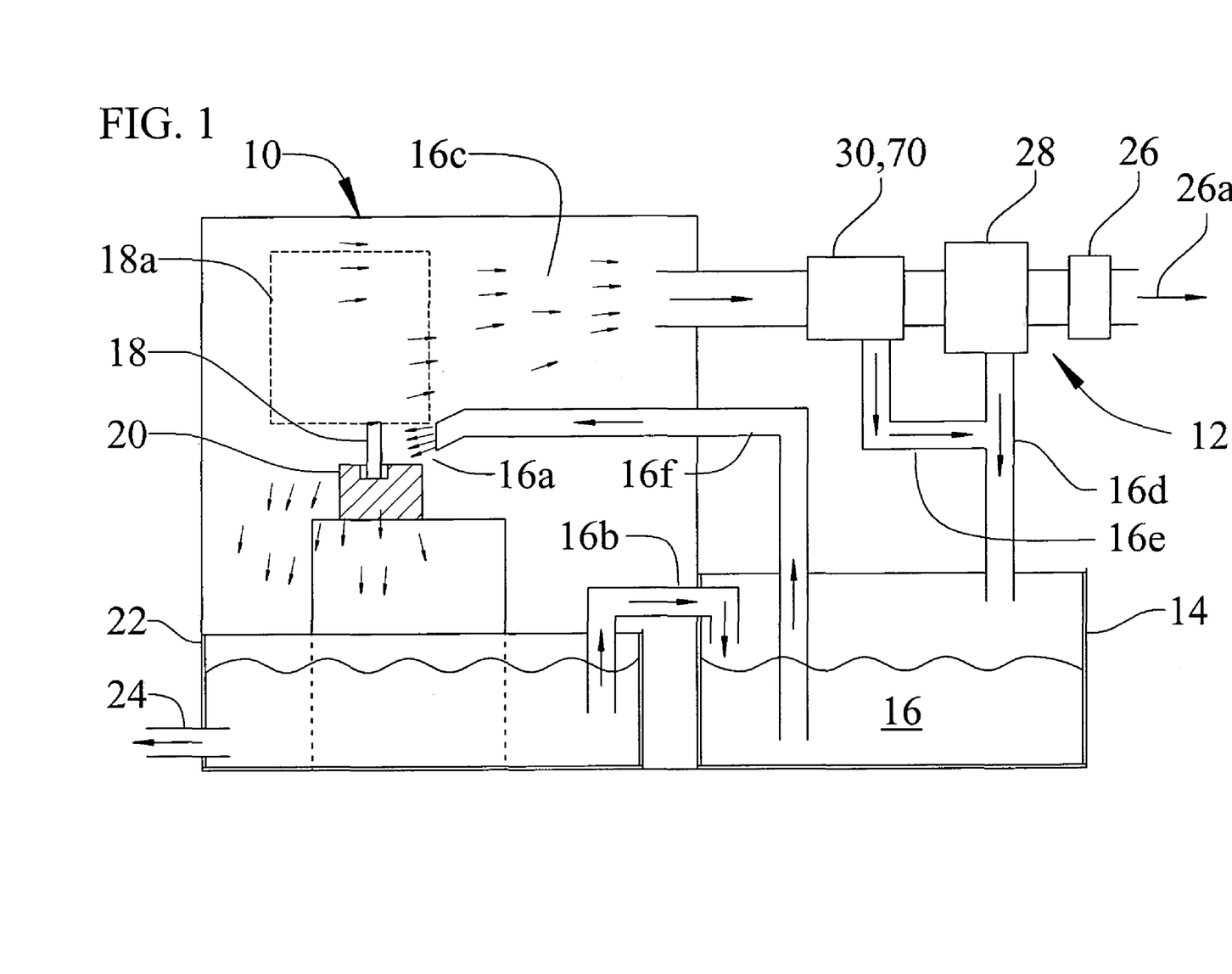
FIG. 1 is a diagrammatic view of a machining station equipped with a mist collection system including a separator in accordance with the present invention.

For purposes of illustration, the present invention is shown diagrammatically in FIG. 1 in connection with a machining center 10 that uses liquid coolant during machining operations, and is provided with a mist collection system 12 for removal of coolant mist from the air surrounding the machining station.

Briefly, the machining center 10 includes a coolant reservoir 14 from which coolant 16 is conveyed as indicated at 16f and is sprayed as at 16a onto the cutting engagement between a cutting tool 18 (driven by a cutting machine indicated in dashed lines at 18a) and a workpiece 20, and a coolant collection and cleaning station 22 from which chips and other contaminate may be discharged as at 24 and cleaned coolant returned to the reservoir as indicated at 16b.

The mist collection system 12 includes a fan 26 that draws contaminated air as generally indicated at 16c from the area surrounding the machining station 10, and through a cleaner 28 for removal of the mist therefrom, the liquid being either returned to the reservoir as at 16d or otherwise disposed of, and the cleaned air being discharged as at 26a. The arrows in FIG. 1 indicate these general coolant and air flow patterns.

The mist collection system 12 is also provided with a separator 30 or 70 positioned upstream of the cleaner 28 for removal of a substantial portion of the mist prior to the air reaching the cleaner. The liquid removed by the separator is either returned to the reservoir as at 16e or otherwise disposed of.

Figure 2:
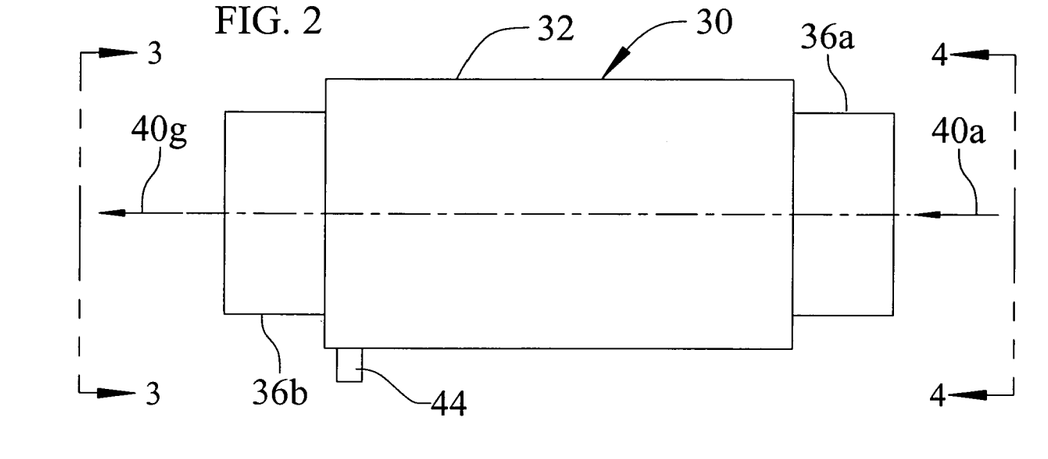
FIG. 2 is a side view of a first embodiment separator in accordance with the invention.
Figure 3:
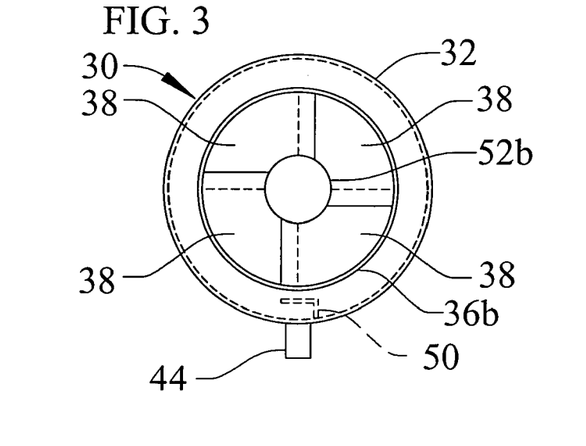
FIGS. 3 and 4 are downstream and upstream end views, respectively, taken along the lines 3-3 and 4-4 of FIG. 2.
Figure 4:
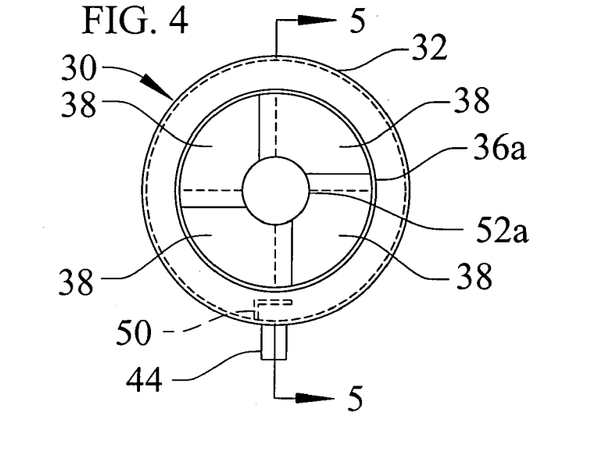

Referring to FIGS. 2-4, there is shown a first embodiment separator 30. The separator 30 includes a cylindrical, tubular housing 32 that establishes a cylindrical inside wall 34 (see FIGS. 5-7), and that is connected between aligned inlet and exit end couplings 36a and 36b provided with associated inlet and exit openings and adapted for connection to the hose or piping of the mist collection system 12 such that mist contaminated air enters as indicated at 40a and pre-cleaned air exits as indicated at 40g. The separator may be used with all types of mist collection systems, including both new and pre-existing systems. Therefore, the end couplings will be adapted and modified as desired for the system in which it is installed.

Figure 5:
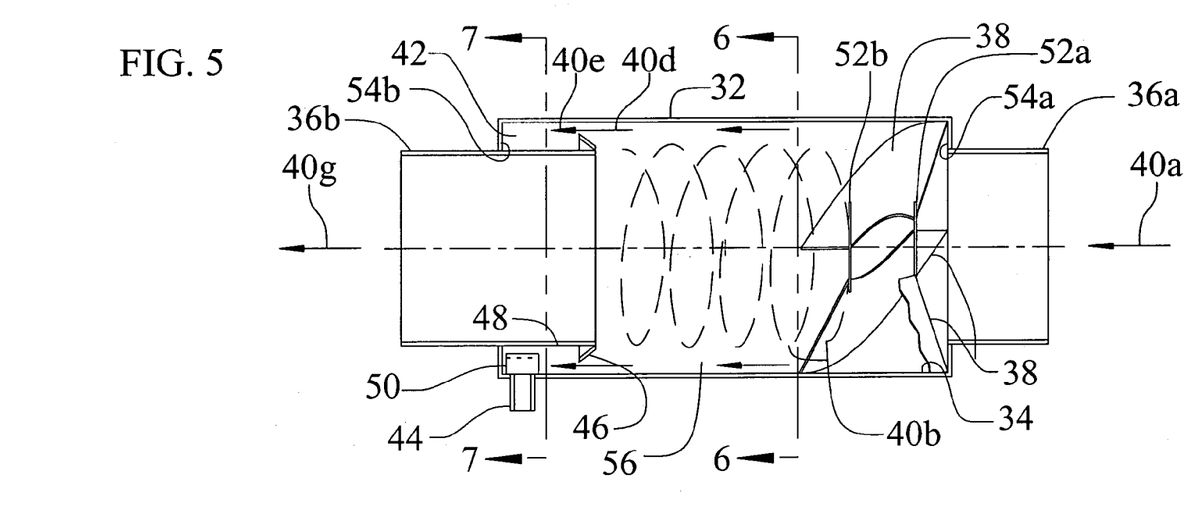
FIG. 5 is a cross-sectional view taken along the line 5-5 of FIG. 4.

Internal stationary vanes 38 are connected in the upstream end portion of the housing 32. The vanes are sized and positioned to establish a cyclonic air flow pattern such as indicated at 40b downstream thereof. The cyclonic action causes the moisture to migrate outwardly as indicated at 40c (FIG. 6) to the inside wall 34, and to flow downwardly along the surface of the inside wall 34 as indicated at 40d. To this end, a separation chamber 56 is defined downstream of the vanes, generally in the center portion of the housing, and is characterized as being of generally open, unobstructed construction as shown in FIG. 5 for maximum separation of moisture from the swirling air flowing therethrough. In preferred embodiments, the vanes are connected at both the upstream and downstream ends, between the inside wall 34 and both longitudinally spaced center supports 52a, 52b to provide for relatively stiff cyclonic-flow inducing vane structure.

A liquid collection chamber 42 is located in the downstream portion of the separator 30 to collect the liquid flowing along the inside wall 34, and to direct the liquid to a drain 44. The liquid collection chamber also establishes a barrier to prevent the liquid from being sucked back into the air as it exits the separator such that, once the liquid enters the chamber, it is generally trapped therein. The collection chamber is an annular, dead-ended space provided with an annular entrance opening that is coincident with the inside wall 34 of the housing such that liquid flowing in the downstream direction along the inside wall of the separation chamber flows directly into the collection chamber as indicated at 40e. In preferred embodiments, the collection chamber is defined between the outside diameter (OD) of an exit tube 48 that extends in the upstream direction from the exit coupling 36b, the inside diameter (ID) of the housing wall 34, a downstream end wall 54b of the housing, and a flow restrictor extending radially outwardly from the exit tube 48 and having an outer periphery spaced inwardly from the cylindrical wall 34 to define the entrance opening to the collection chamber therebetween. For separators intended to be used in a generally vertical orientation, the drain hole 44 is preferably positioned with its downstream open edge coincident with or slightly downstream of the radially outer edge of the end wall 54b (to the left as shown in FIG. 5) to preclude a dead-space behind the drain hole in which liquid could accumulate.

The flow restrictor 46 is sized to allow the liquid flowing along the wall 34 to flow into the collection area as indicated at 40d-e, but is sized to substantially restrict the annular flow area to prevent the liquid in the chamber 42 from being sucked back out by the vacuum pressure resulting from the air flow pattern restricting at the exit. The flow restrictor 46 is preferably provided in the form of a tapered cone, either with straight outer profile shown or with an outer profile that includes a slight curvature, that diverges outwardly in the downstream direction to provide for a converging entrance leading into the collection chamber, and that is connected to the upstream end of the exit cylinder 48, which in this instance, is an extension of the downstream end coupling 36b. Alternate connection of the flow restrictor and construction of the annular liquid collection chamber in accordance herewith will be will be apparent to and readily devised by those skilled in the art.

Figure 6:
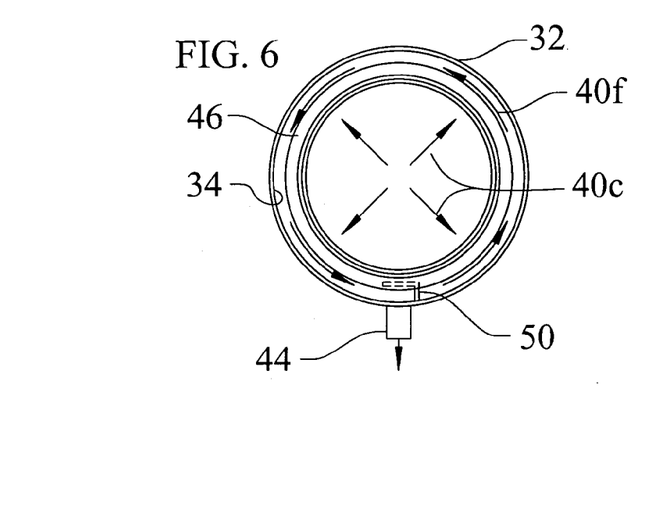
FIGS. 6 and 7 are cross-sectional views taken along the lines 6-6 and 7-7 of FIG. 5.
Figure 7:
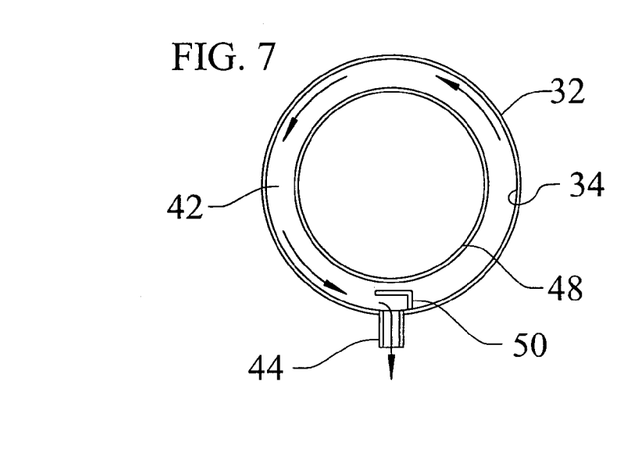
Figure 8:
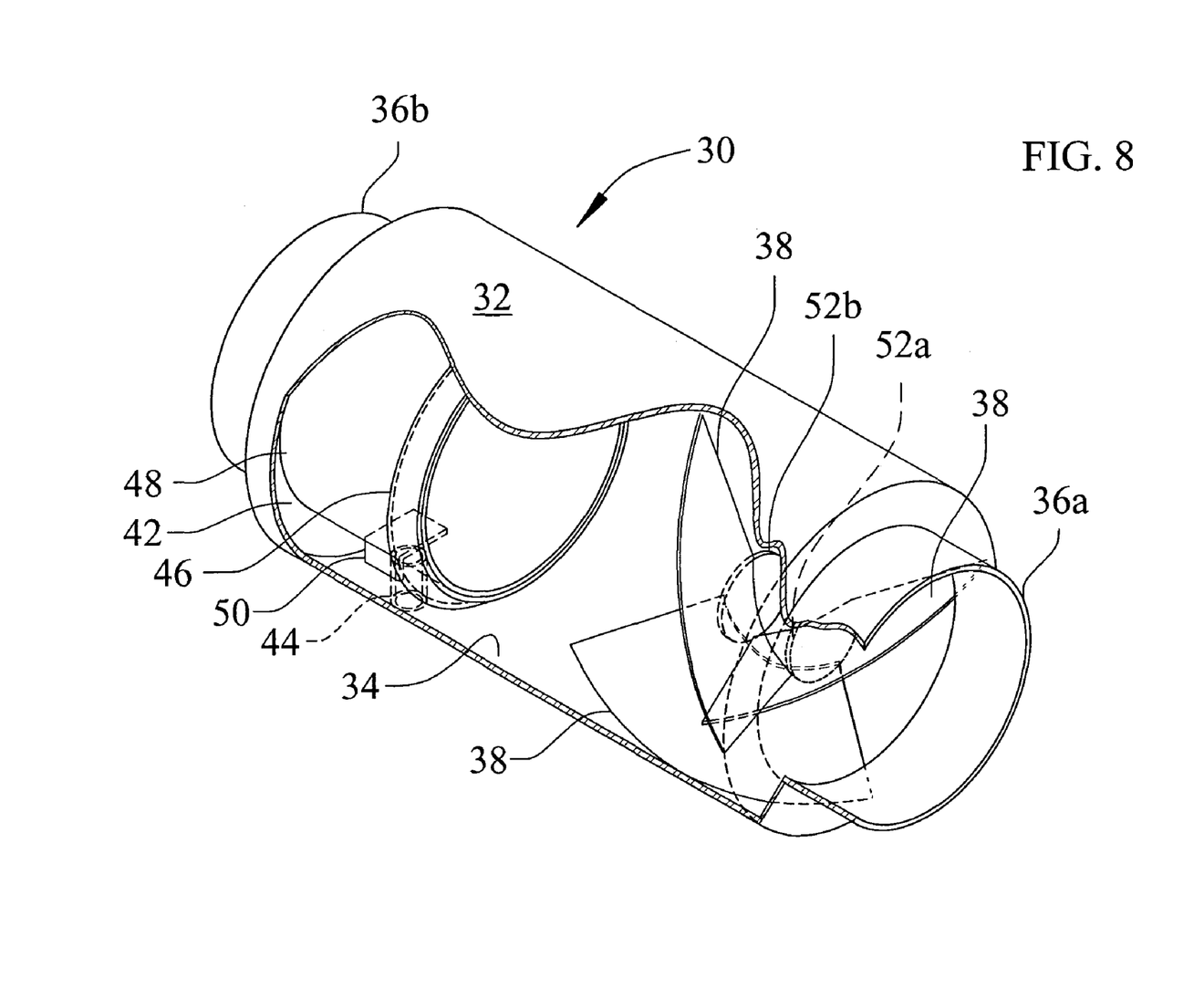
FIG. 8 is a perspective of the first embodiment separator, with portions of the separator housing being cut-away for clarity of showing certain internal components.
Figures 9, 10, 11:
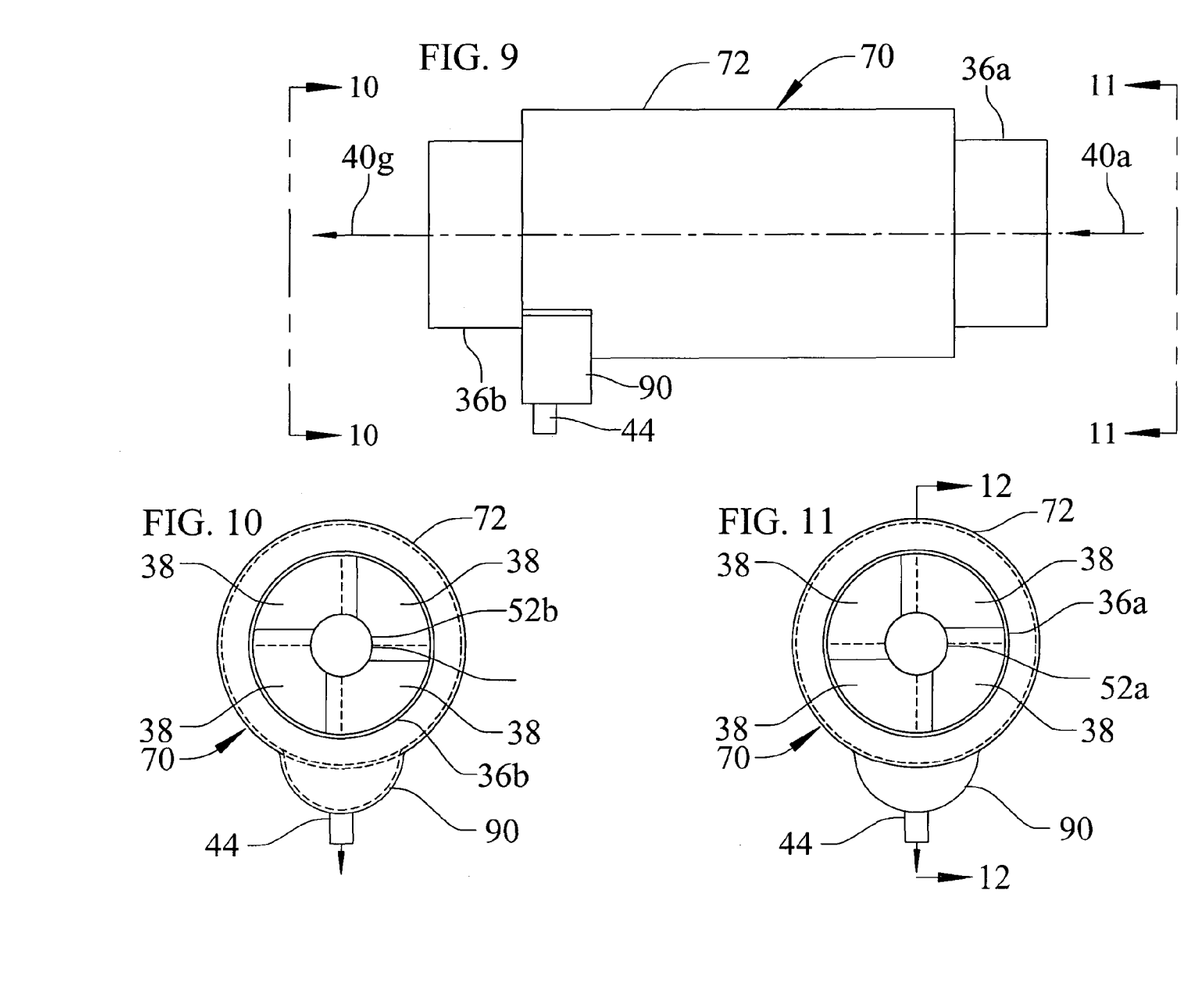
FIG. 9 is a side view of a second embodiment separator in accordance with the invention.
FIGS. 10 and 11 are downstream and upstream end views, respectively, taken along the lines 10-10 and 11-11 of FIG. 9.

In the collection chamber 42, the liquid continues to flow in a generally circular pattern such as indicated at 40f in FIG. 6. Upon reaching the downstream end and bottom of the collection chamber, circulation of the liquid is interrupted by a flow-interrupter 50 that projects into the collection chamber in the downstream end portion proximate the downstream wall 54b. The flow interrupter is shaped to direct the liquid flowing around the collection chamber to the drain 44. The flow interrupter is preferably provided in the form of a generally radially inwardly extending wall portion that breaks the swirling flow at the drain. To this end, the flow interrupter is preferably connected or located just downstream of the drain with respect to the swirling flow of liquid therein, and is provided in a form that includes at least a first portion that projects generally radially inwardly from and extends generally longitudinally along the wall 34. In preferred embodiments, the flow interrupter is further provided with a second portion that extends generally substantially circumferentially from the first portion such as the L-shaped hood shown that extends over and above the drain hole, or in the form of a curved-hood that curves over and above the drain hole. It has been found that, in most instances encountered, the hood extending to a position over the drain hole is preferred as providing better direction of the liquid into the drain as compared with, for example, a straight interrupter consisting of only the first generally radially projecting portion.

For use in existing mist collection systems, the separator 30 is preferably adapted for relatively low air pressure drop. This allows use of the separator to be used within the air-flow capacity of the fan of the existing system. To this end, in preferred embodiments, the separator is provided with upstream and downstream annular walls 54a, 54b that extend radially outwardly from associated inlet and exit couplings 36a, 36b proximate the inlet and exit openings, and the inside wall 34 extends therebetween to define an upstream expansion chamber into which the air flow enters upon flowing through the inlet opening and in which the stationary vanes are located, the inside diameter of the wall 34 being preferably approximately one-fourth to one-third larger than the diameter of the hoses and end couplings 36a, 36b (i.e., the diameter of the inlet and exit openings) for a relatively low pressure drop embodiment.

By way of dimensional example, one of the common size hoses currently used in mist collectors are six inch hoses. In this instance, it has been found that a cylindrical wall ID of eight inches, with end coupling of six inches diameter, provides relatively low pressure drop; and that four vanes extending longitudinally approximately four and one-half (4-½) inches, with the leading edges set at an angle of approximately 25 degrees with respect to the upstream opening face (as seen in FIG. 5), and extending longitudinally therefrom at an angle of approximately 35 degrees with respect to a longitudinal axis therethrough, provides good cyclonic action in the separator.

It has also been found that a flow restrictor adapted to provide a radial clearance of approximately one-fourth (¼) to one-half (½) inch, and preferably three-eighths (⅜) inch allows the liquid to enter the collection chamber 42, while providing good restriction to prevent the liquid from leaving the chamber. In this example, as well as other similarly sized units such as for eight inch hoses provided with a ten inch ID wall and a flow restrictor cone radial clearance of approximately three-eighths inch, removal of between 85-95% of the mist from the air has been consistently achieved, with a relatively low pressure drop.

It will also be understood, however, that for new design systems where the pressure drop may be permitted to rise, because the capacity of the fan has not yet been established (as compared to existing mist collections systems with an already installed fan), the dimensional difference between the end couplings and the inside diameter of the housing may be reduced.

It has also been found that the optimum size and number of vanes to establish the desired cyclonic action will vary depending on the size of the cylindrical wall 34. Continuing with the above dimensional examples, it has been found that three vanes of suitable size provide good cyclonic action in a separator with a six inch ID, and five vanes may be required in the larger ten inch housing.

Referring now to FIGS. 9-15, there is shown an alternate embodiment separator 70, the construction and operation of which is generally the same as the construction and operation of separator 30 except as described below. Components of separator 70 that are the same as components of separator 30 are identified in the drawings with the same reference numerals, and components that are equivalent or similar or perform the equivalent or similar function are identified with reference numerals incremented by 40 from the reference numerals identifying corresponding components in separator 30.

Briefly, separator 70 includes a tubular housing 72 that establishes inside cylindrical walls 74 (FIGS. 12-15) connected between inlet and exit couplings 36a and 36b for connection to the hose or piping of the mist collection system 12 (FIG. 1). Internal stationary vanes 38 are installed into the upstream end of the housing between center supports 52a and 52b to establish cyclonic flow through expansion chamber 56. The housing 72 is essentially the same as housing 32 of separator 30 except for modifications associated with provision of an alternate flow interrupter 90.

The flow interrupter 90 is provided in the form of a drop-down chamber establishing fluid connection between the annular collection chamber 42 and the drain port 44. As with flow interrupter 50, the drop-down chamber 90 interrupts the flow of liquid swirling in the collection chamber. The drop-down chamber 90 is further configured to encourage the liquid to automatically flow out of the collection chamber and into a reservoir defined in the drop-down chamber as the liquid swirls toward the drain port.

Figure 12:
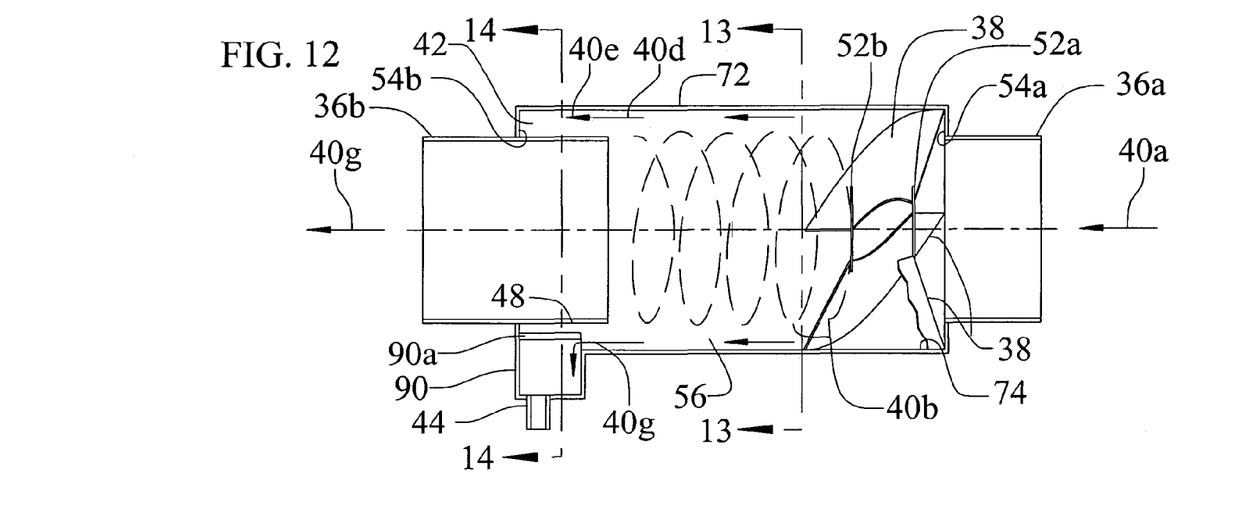
FIG. 12 is a cross-sectional view taken along the line 12-12 of FIG. 11.
Figure 13:
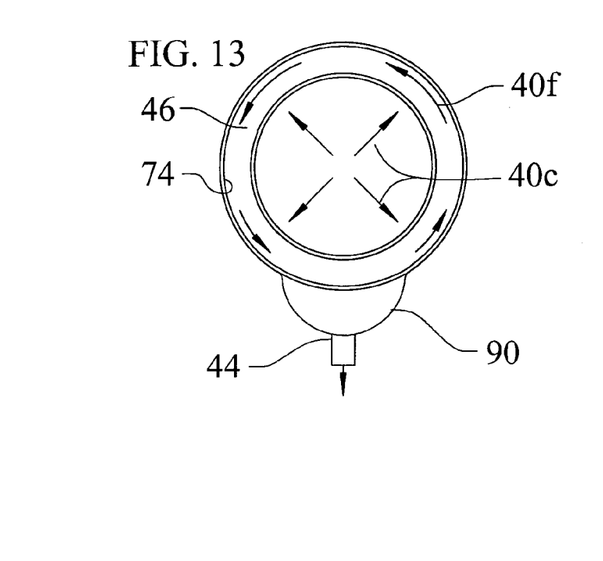
FIGS. 13 and 14 are cross-sectional views taken along the lines 13-13 and 14-14 of FIG. 12.
Figure 14:
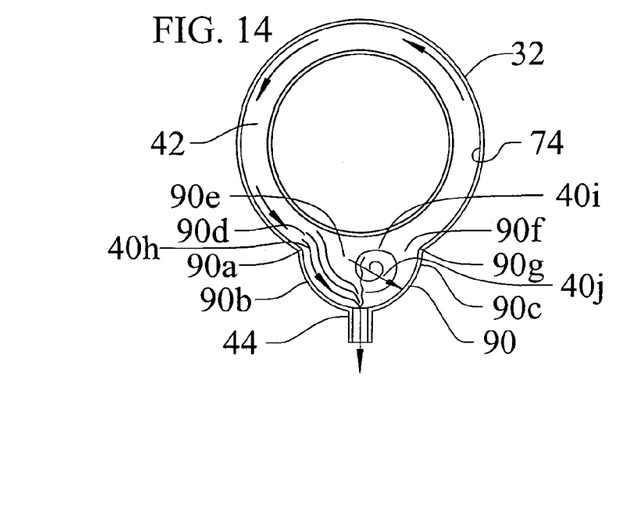
Figure 15:
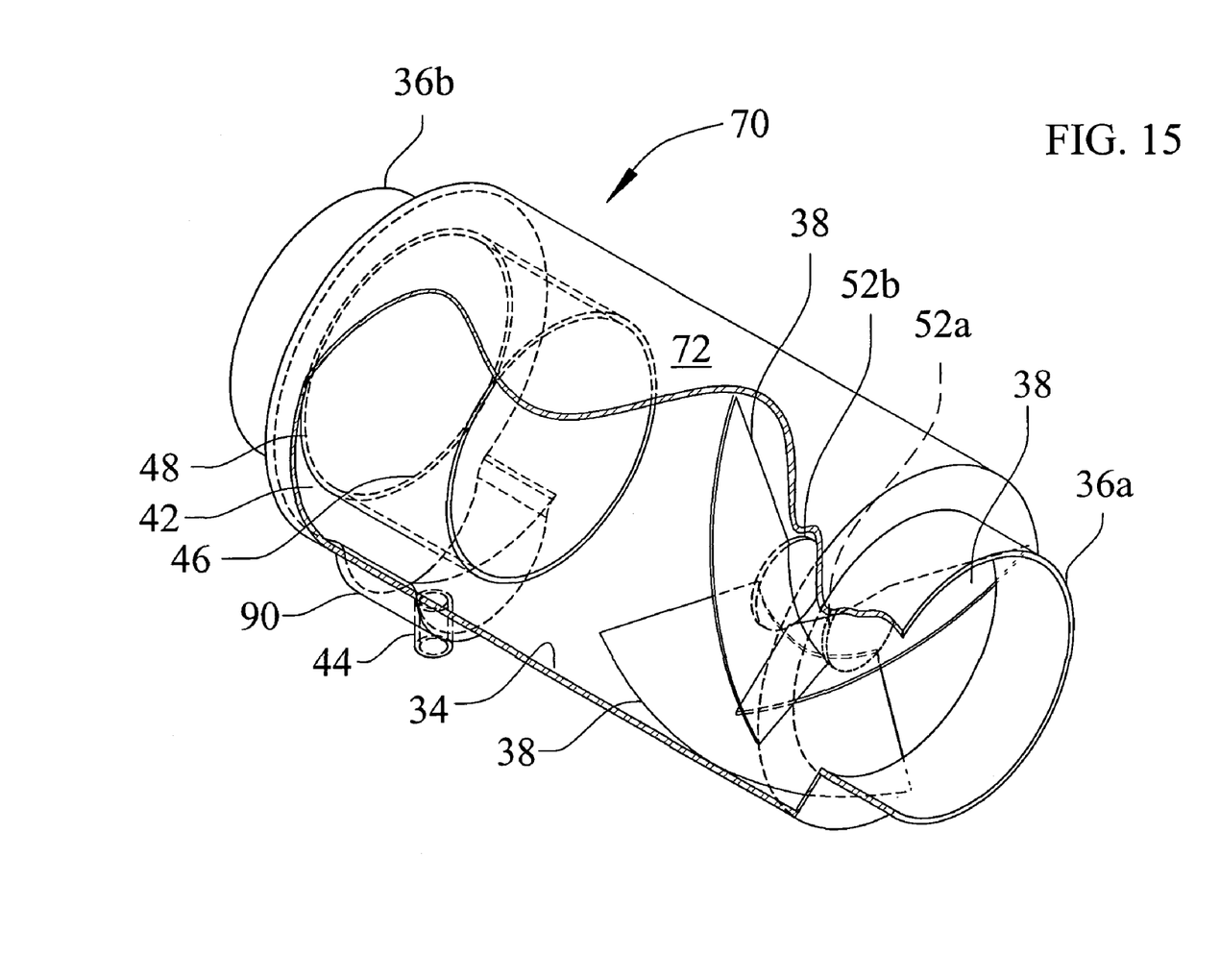
FIG. 15 is a perspective of the second embodiment separator, with portions of the separator housing being cut-away for clarity of showing certain internal components.

Referring to the details shown in FIG. 14, the drop-down chamber 90 is characterized with an enlarged transition opening 90d at approximately the outer diameter of the annular collection chamber 42, and a reservoir communicating with the transition opening. The transition opening is established between the inside diameter of the collection chamber 42 (the outside diameter of tube 48) and an inlet-side transition edge 90a that extends longitudinally (parallel to the axis of the unit) along a substantial length of the collection chamber as shown in FIG. 12, upstream of the drain with respect to the swirling liquid in the collection chamber, to establish the enlarged transition opening along such length. The reservoir includes a first reservoir part 90e between the transition opening 90d and the drain port 44, and a second reservoir part 90f between the drain port and a downstream exit-side transition edge 90g at the outer diameter of the collection chamber. As viewed from above, the transition edges establish therebetween a relatively wide, longitudinally extending slot opening from the collection chamber into the reservoir substantially along the length of the collection chamber through which the liquid in the collection chamber drops upon swirling past.

The preferred first reservoir part 90e is established, at least in part, by a longitudinally extending large radius or curved upstream side 90b extending concavely outwardly from the upstream transition edge 90a such that the transition edge 90a and the upstream side 90b combine to establish a smoothly transitioning wall structure upon going from the collection chamber 42 into the upstream reservoir part 90e, and thereby establish a smoothly transitioning flow path from the collection chamber into the reservoir. As illustrated with flow lines 40h, this smoothly transitioning flow path permits the swirling liquid in the collection chamber to transition into the reservoir with relatively small and smooth change in flow direction. Thus, the drop-down chamber 90 interrupts the flow of the swirling liquid in the collection chamber, and results in automatic redirection of the flow into the reservoir defined therein. Although centrifugal forces will tend to cause the liquid to automatically flow from the collection chamber into a drop-down chamber of any configuration, the preferred smoothly transitioning flow path assists in maintaining turbulence from abrupt flow changes to a low level, thereby reducing turbulent flow patterns that might allow liquid to exit the reservoir and re-enter the collection chamber. The second reservoir part 90f is established, at least in part, by a downstream side 90c extending outwardly from the downstream transition edge 90g. The downstream side 90c of the reservoir further aids in capturing liquid in the drop-down chamber, and maintaining liquid in the drop-down chamber such as indicated at 40i that does not immediately flow out the drain port 44. In the event the velocity and centrifugal forces of the liquid result in the liquid entering the reservoir along a substantially straight flow path such as indicated at 40j, the liquid will impinge onto the downstream side 90c and be captured in the reservoir. Referring to FIG. 12, it is noted that additional liquid will enter directly into the upstream end of the reservoir as indicate at 40g.

The drop-down chamber 90 is further characterized as sized relatively large in comparison to the size of the collection chamber 42, to accept transient high volume liquid collection conditions, and generally prevent liquid from re-entering the collection chamber during such transient conditions should the volume of liquid entering the collection chamber exceeds the flow capability of the drain port 44.

In the preferred embodiment shown in the drawings, the drop-down chamber 90 is established as a generally semi-cylindrical chamber (semi-circular in cross-section, as shown in FIG. 14) with its central axis running parallel but offset from the center axis of the unit by approximately the sum of the radii, and extending substantially along the length of the collection chamber. This preferred drop-down chamber results in flow interruption of substantially all of the swirling liquid in the collection chamber, and automatic removal of such liquid from the collection chamber. To insure performance during transient high volume liquid collection condition, the preferred drop-down chamber is provided with a radius of approximately one-half (e.g., ⅓ to ⅔) the radius of the collection chamber 42. For the dimensional example discussed above (in connection with separator 30), the annular collection chamber will have a cross-sectional flow area of PIE×(82−62)~88 sq. inches. A drop-down chamber of 4 inches diameter results in a cross-sectional area of ~25 sq. inches, or about 30% of the cross-sectional flow area of the collection chamber. Surprisingly, it has been found that this preferred drop-down chamber configuration is sufficiently effective at removing liquid from the collection chamber so as to substantially eliminate the possibility that liquid in the collection chamber might be drawn our of the collection chamber, around the upstream end of the tube 48, and back into the air flow exiting the separator. Consequently, the flow interrupter 90 has eliminated the need for a flow restrictor structure in the separator 70 that corresponds to flow restrictor 46 in collector 30 at the inlet to the collection chamber.

From the foregoing, it will be apparent that the present invention brings to the art a new and improved mist separator which, by virtue of unique alternate configurations, is adapted to remove a substantial portion of mist from contaminated air drawn from a machining station and prior to the final cleaning stage device of a mist collection system. As a result, the work-load of the final stage cleaning device is substantially reduced, resulting in reduction in periodic maintenance and operational costs of the mist collection system.

I claim:

1. A separator for a mist collection system comprising:
    a) a cylindrical tube provided with inlet and exit openings to allow air to be drawn therethrough,
    b) a set of stationary vanes connected in the upstream portion of the tube and sized and positioned to direct the air flowing therethrough in a cyclonic path through the tube such that mist in the air therein migrates outwardly to and in the downstream direction along the inside wall of the tube,
    c) an annular collection chamber defined in the downstream end of the tube and having an annular upstream opening coincident with the inside wall of the tube such that liquid flowing along the inside of the tube toward the downstream end thereof flows directly into the collection chamber,
    d) an annular flow restrictor positioned at the upstream opening of the collection chamber and sized for free flow of liquid along the inside wall of the tube into the chamber and for blocking back-flow out of the chamber, the flow restrictor being further sized to provide radial clearance with the inside cylindrical wall of the tube of between approximately one-fourth (¼) to one-half (½) inch,
    e) a drain hole positioned near the downstream end of the collection chamber, and
    f) a flow interrupter projecting into the collection chamber to direct the liquid therein into the drain.

2. The separator of claim 1 in which the flow restrictor diverges conically in the downstream direction to define a converging entrance to the chamber.

3. The separator of claim 1 in which the flow interrupter includes a first portion that projects generally radially from and extends longitudinally along the inside wall of the tube.

4. The separator of claim 3 in which the flow interrupter further includes a second portion that extends substantially circumferentially from the first portion.

5. The separator of claim 1 in which the flow interrupter is connected to project from downstream of the drain with respect to the swirling flow of liquid in the collection chamber to a position generally radially inwardly of the drain.

6. The separator of claim 1 in which the vanes (i) are provided with leading edges set at an angle of approximately 25 degrees with respect to the inlet opening, and (ii) extend substantially longitudinally therefrom at an angle of approximately 35 degrees with respect to a longitudinal axis therethrough and for longitudinal distance of approximately four and one-half (4-½) inches.

7. A separator for a mist collection system comprising:
 a) inlet and exit couplings provided with inlet and exit openings, respectively, to allow air to be drawn therethrough,
 b) upstream and downstream annular walls extending outwardly from the inlet and exit couplings proximate the inlet and exit openings, respectively,
 c) an outer cylindrical tube connected between the upstream and downstream annular walls coaxial with and located radially outwardly of the inlet and exit openings to define (i) an upstream expansion chamber into which the air flow enters upon flowing through the inlet opening and (ii) a centrally located, open separation chamber downstream of the expansion chamber,
 d) a set of stationary vanes fixed in the expansion chamber and sized and positioned to direct the air flowing therethrough in a cyclonic path into the separation chamber such that mist in the air therein migrates radially outwardly to and in the downstream direction along the inside wall of the outer tube,
 e) an inner cylindrical tube extending forwardly from the downstream annular wall radially inwardly of the outer tube portion, the inner tube cooperating with the outer tube and the downstream wall to define an annular dead-ended collection chamber bounded therebetween and having an upstream annular opening coincident with the inside wall of the outer tube into the separation chamber such that liquid flowing toward the downstream end along the inside wall of the outer tube flows directly into the collection chamber,
 f) an annular flow restrictor extending outwardly from the upstream end portion of the inside tube to define a converging flow path entrance into the collection chamber, the flow restrictor being sized to provide radial clearance with the inside wall of the outer tube of between approximately one-fourth (¼) to one-half (½) inch, and
 g) a drain hole positioned near the downstream end of the collection chamber for discharging the liquid collected in the chamber.

8. The separator of claim 7 in which the flow restrictor diverges conically outwardly in the downstream direction.

9. The separator of claim 7 in which the vanes (i) are provided with leading edges set at an angle of approximately 25 degrees with respect to the inlet opening, and (ii) extend substantially longitudinally therefrom at an angle of approximately 35 degrees with respect to a longitudinal axis therethrough and for longitudinal distance of approximately four and one-half (4-½) inches.

10. The separator of claim 7 further comprising a flow interrupter positioned in the collection chamber to direct liquid therein into the drain.

11. The separator of claim 10 in which the flow interrupter extends longitudinally along the downstream end portion of the collection chamber.

12. The separator of claim 11 in which the flow interrupter is connected to extend from downstream of the drain with respect to the swirling flow of liquid in the collection chamber to a position generally radially inwardly of the drain hole.

13. A mist collection system for machine-tool liquids comprising:
 a) an inlet,
 b) an outlet,
 c) a fan to draw mist-contaminated air through the inlet and to discharge the air through the outlet,
 d) a cyclonic mist separator connected between the inlet and the outlet such that mist-contaminated air is drawn therethrough by the fan, the separator having
  i) an inside cylindrical wall through which the air flows,
  ii) a set of stationary vanes positioned in the upstream portion of the cylindrical wall, the vanes being sized and positioned to direct the air flowing therethrough in a cyclonic path such that mist therein migrates outwardly to and flows downstream along the cylindrical wall,
  iii) a collection chamber extending coaxial from the cylindrical wall such that liquid flowing toward the downstream end of the cylindrical wall flows into the collection chamber,
  iv) a drain hole positioned near the downstream end of the collection chamber for discharging the liquid therefrom, and
  v) a flow interrupter configured to interrupt the flow of liquid in the collection chamber and to direct the liquid therein into the drain hole such that the separator pre-cleans mist from the air, and
 e) a final mist-cleaning station downstream of the cyclonic mist separator through which the pre-cleaned air flows for final cleaning.

14. The separator of claim 13 further comprising a flow restrictor positioned at the inlet of the collection chamber, the flow restrictor being sized for free flow of liquid along the inside cylindrical wall into the collection chamber and for blocking back-flow out of the collection chamber.

15. The mist collection system of claim 14 in which the flow restrictor is sized to provide radial clearance with the cylindrical wall of between approximately one-fourth (¼) to one-half (½) inch.

16. The separator of claim 15 in which the flow restrictor diverges conically in the downstream direction.

17. The separator of claim 14 in which the flow interrupter is connected to project from downstream of the drain with respect to the swirling flow of liquid in the collection chamber to a position generally inwardly of the drain.

18. The separator of claim 14 in which the vanes (i) are provided with leading edges set at an angle of approximately 25 degrees with respect to the inlet opening, and (ii) extend substantially longitudinally therefrom at an angle of approximately 35 degrees with respect to a longitudinal axis therethrough and for longitudinal distance of approximately four and one-half (4-½) inches.

19. The separator as defined in claim 14 in which the flow interrupter includes (a) a reservoir located radially outwardly of the collection chamber and in fluid communication with the drain, and (b) a transition opening establishing fluid communication between the collection chamber and the reservoir, the transition opening being defined in part with an inlet-side transition edge extending longitudinally in the tube upstream of the drain with respect to the swirling liquid in the collection chamber.

20. A separator for a mist collection system comprising:
a) inlet and exit couplings provided with inlet and exit openings, respectively, to allow air to be drawn therethrough,
b) upstream and downstream annular walls extending outwardly from the inlet and exit couplings proximate the inlet and exit openings, respectively,
c) an outer cylindrical tube connected between the upstream and downstream annular walls coaxial with and located radially outwardly of the inlet and exit openings to define (i) an upstream expansion chamber into which the air flow enters upon flowing through the inlet opening and (ii) a centrally located, open separation chamber downstream of the expansion chamber,
d) a set of stationary vanes fixed in the expansion chamber and sized and positioned to direct the air flowing therethrough in a cyclonic path into the separation chamber such that mist in the air therein migrates radially outwardly to and in the downstream direction along the inside wall of the outer tube, the vanes (i) being provided with leading edges set at an angle of approximately 25 degrees with respect to the inlet opening, and (ii) extending substantially longitudinally therefrom at an angle of approximately 35 degrees with respect to a longitudinal axis therethrough,
e) an inner cylindrical tube extending forwardly from the downstream annular wall radially inwardly of the outer tube portion, the inner tube cooperating with the outer tube and the downstream wall to define an annular dead-ended collection chamber bounded therebetween and having an upstream annular opening coincident with the inside wall of the outer tube into the separation chamber such that liquid flowing toward the downstream end along the inside wall of the outer tube flows directly into the collection chamber,
f) an annular flow restrictor extending outwardly from the upstream end portion of the inside tube to define a converging flow path entrance into the collection chamber, and
g) a drain hole positioned near the downstream end of the collection chamber for discharging the liquid collected in the chamber.

21. The separator of claim 20 in which the flow restrictor diverges conically outwardly in the downstream direction.

22. The separator of claim 20 in which the vanes extend for longitudinal distance of approximately four and one-half (4-½) inches.

23. The separator of claim 20 further comprising a flow interrupter positioned in the collection chamber to direct liquid therein into the drain.

24. The separator of claim 23 in which the flow interrupter extends longitudinally along the downstream end portion of the collection chamber.

25. The separator of claim 23 in which the flow interrupter is connected to extend from downstream of the drain with respect to the swirling flow of liquid in the collection chamber to a position generally radially inwardly of the drain hole.

26. A separator for a mist collection system comprising:
a) a cylindrical tube provided with inlet and exit openings to allow air to be drawn therethrough,
b) a set of stationary vanes connected in the upstream portion of the tube and sized and positioned to direct the air flowing therethrough in a cyclonic path through the tube such that mist in the air therein migrates outwardly to and in the downstream direction along the inside wall of the tube, the vanes (i) being provided with leading edges set at an angle of approximately 25 degrees with respect to the inlet opening, and (ii) extending substantially longitudinally therefrom at an angle of approximately 35 degrees with respect to a longitudinal axis therethrough,
c) an annular collection chamber defined in the downstream end of the tube and having an annular upstream opening coincident with the inside wall of the tube such that liquid flowing along the inside of the tube toward the downstream end thereof flows directly into the collection chamber,
d) a drain positioned near the downstream end of the collection chamber, and
e) a flow interrupter configured to interrupt the flow of liquid in the collection chamber and to direct the liquid from the collection chamber into the drain.

27. The separator of claim 24 further comprising an annular flow restrictor positioned at the upstream opening of the collection chamber, the flow restrictor being sized for free flow of liquid along the inside wall of the tube into the chamber and for blocking back-flow out of the chamber.

28. The separator of claim 25 in which the flow restrictor diverges conically in the downstream direction to define a converging entrance to the collection chamber.

29. The separator of claim 24 in which the flow interrupter includes a first portion that projects into the collection chamber and extends longitudinally from the inside wall of the tube downstream of the drain with respect to the swirling flow of liquid in the collection chamber.

30. The separator of claim 27 in which the flow interrupter further includes a second portion that extends from the first portion to a position generally radially inwardly of the drain.

31. The separator of claim 24 in which the vanes extend for longitudinal distance of approximately four and one-half (4-½) inches.

32. The separator as defined in claim 24 in which the flow interrupter includes
a) a reservoir located radially outwardly of the collection chamber and in fluid communication with the drain, and
b) a transition opening establishing fluid communication between the collection chamber and the reservoir, the transition opening being defined in part with an inlet-side transition edge extending longitudinally in the tube upstream of the drain with respect to the swirling liquid in the collection chamber.

33. A separator for a mist collection system comprising:
a) a cylindrical tube provided with inlet and exit openings to allow air to be drawn therethrough,
b) a set of stationary vanes connected in the upstream portion of the tube and sized and positioned to direct the air flowing therethrough in a cyclonic path through the tube such that mist in the air therein migrates outwardly to and in the downstream direction along the inside wall of the tube,
c) an annular collection chamber defined in the downstream end of the tube and having an annular upstream opening coaxial with the inside wall of the tube such that liquid flowing along the inside of the tube toward the downstream end thereof flows directly into the collection chamber,
d) a drain positioned near the downstream end of the collection chamber, and
e) a flow interrupter configured to interrupt the flow of liquid in the collection chamber and to direct the liquid from the collection chamber into the drain, the flow interrupter having i) a reservoir located radially outwardly of the collection chamber and in fluid communication with the drain, and ii) a transition opening establishing fluid communication between the collection chamber and the reservoir, the transition opening being defined in part with an inlet-side transition edge extending longitudinally in the tube upstream of the drain with respect to the swirling liquid in the collection chamber.

34. The separator as defined in claim 33 in which the reservoir is sized with a cross-sectional flow area of between approximately one-fourth to one-third the cross-sectional flow area of the annular collection chamber.

35. The separator as defined in claim 33 in which the reservoir includes a first reservoir part having a first curved side extending concavely outwardly from the longitudinally extending first transition edge to establish a smoothly transitioning flow path from the collection chamber across the transition edge and into the reservoir.

36. The separator as defined in claim 35 in which the reservoir further includes a second reservoir part having a second transition edge extending longitudinally in the tube and spaced downstream of the drain with respect to the swirling liquid in the collection chamber, and having a second side closing the reservoir between the first side and the second transition edge.

37. The separator as defined in claim 36 in which the flow interrupter is provided in the form of a semi-cylindrical drop-down chamber with its center axis parallel to but offset from the center axis of the annular chamber, the drop-down chamber having the reservoir defined therein and being connected longitudinally along the transition edges to the tube.

38. The separator as defined in claim 37 in which the radius of the semi-cylindrical drop-down chamber is between one-third to two-thirds the radius of the tube.

39. The separator as defined in claim 37 in which the center axis of the semi-cylindrical drop-down chamber is offset from the center axis of the tube be a distance approximately equal to the sum of the radii of the tube and the drop-down chamber.

40. A separator for a mist collection system comprising:

a) a cylindrical tube provided with inlet and exit openings to allow air to be drawn therethrough, b) a set of stationary vanes connected in the upstream portion of the tube and sized and positioned to direct the air flowing therethrough in a cyclonic path through the tube such that mist in the air therein migrates outwardly to and in the downstream direction along the inside wall of the tube, the vanes (i) being provided with leading edges set at an angle of approximately 25 degrees with respect to the inlet opening, and (ii) extending substantially longitudinally therefrom at an angle of approximately 35 degrees with respect to a longitudinal axis therethrough, c) an annular collection chamber defined in the downstream end of the tube and having an annular upstream opening coincident with the inside wall of the tube such that liquid flowing along the inside of the tube toward the downstream end thereof flows directly into the collection chamber, d) an annular flow restrictor positioned at the upstream opening of the collection chamber and sized for free flow of liquid along the inside wall of the tube into the chamber and for blocking back-flow out of the chamber, e) a drain hole positioned near the downstream end of the collection chamber, and f) a flow interrupter projecting into the collection chamber to direct the liquid therein into the drain.

41. The separator as defined in claim 40 in which the vanes extend for a longitudinal distance of approximately four and one-half (4-½) inches.

* * * * *